US 6,549,509 B2

(12) United States Patent
Sawano

(10) Patent No.: US 6,549,509 B2
(45) Date of Patent: *Apr. 15, 2003

(54) THREE-DIMENSIONAL OPTICAL MEMORY

(75) Inventor: Mitsuru Sawano, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/954,009

(22) Filed: Sep. 18, 2001

(65) Prior Publication Data

US 2002/0015366 A1 Feb. 7, 2002

Related U.S. Application Data

(63) Continuation of application No. 09/311,741, filed on May 14, 1999, now Pat. No. 6,341,120.

(30) Foreign Application Priority Data

May 18, 1998 (JP) ............................................. 10-135307

(51) Int. Cl.[7] .............................. G11B 7/24; G11B 7/00
(52) U.S. Cl. .................................. 369/275.3; 369/44.34
(58) Field of Search .......................... 369/44.34, 44.26, 369/275.1, 275.3, 275.2, 124, 284, 286, 288, 100, 47.27, 53.3, 44.17, 44.24, 275.4

(56) References Cited

U.S. PATENT DOCUMENTS

| 4,578,788 A | 3/1986 | Ahn et al. ............... 369/275.1 |
| 5,163,039 A | 11/1992 | Lindmayer ................. 369/100 |
| 5,195,082 A | 3/1993 | Revay et al. ............ 369/275.2 |
| 5,572,502 A | 11/1996 | Naruse et al. .............. 369/116 |
| 5,883,878 A | 3/1999 | Satoh et al. ............ 369/275.1 |
| 5,933,410 A | 8/1999 | Nakane et al. .......... 369/275.3 |
| 6,091,699 A | * 7/2000 | Nakane et al. .......... 369/275.3 |
| 6,185,181 B1 | * 2/2001 | Kawase ................... 369/275.3 |
| 6,337,845 B1 | * 1/2002 | Nakane et al. .......... 369/275.3 |
| 6,341,120 B1 | * 1/2002 | Sawano ................... 369/275.1 |

FOREIGN PATENT DOCUMENTS

EP          0269381          6/1988

* cited by examiner

Primary Examiner—Ali Neyzari
(74) Attorney, Agent, or Firm—Sughrue Mion, PLLC

(57) ABSTRACT

An optical disk (2) includes a plurality of layers in a three-dimensional direction (i.e., "thickness direction" or "depth direction") thereof. A plurality of recording surfaces are respectively formed on the layers, the recording surfaces each has data recording tracks (16) extending along a peripheral direction of the optical disk (2). Sample servo marks (11) each has at least two mark portions (11a, 11b). The two mark portions (11a, 11b) are arranged in a zig-zag manner to be shifted in the thickness direction of the optical disk (2) such that the two mark portions (11a, 11b) interpose one of the data recording tracks (16). In particular, since a total value of positional difference of the two mark portions (11a, 11b) in the thickness direction is set larger than a focus depth of an optical beam emitted from an optical head, difference in intensities of the reflected beams from the two mark portions (11a, 11b) appears even when a focus of the optical beam is varied, and therefore, the sample servo marks 11 can be surely detected.

12 Claims, 5 Drawing Sheets

THREE-DIMENSIONAL OPTICAL MEMORY

This is a Continuation of application Ser. No. 09/311,741 filed May 14, 1999 now U.S. Pat. No. 6,341,120, the disclosure of which is incorporated herein by reference.

BACKGROUND OF THE INVENTION

1. Field of the Invention

The present invention relates to a three-dimensional optical memory for recording data on a recording medium in a multi-layer manner.

The present application is based on Japanese Patent Application No. Hei. 10-135307, which is incorporated herein by reference.

2. Description of the Related Art

Generally, single layer recording has been employed in the optical disk, the optical card, and the optical tape. Recently, a method of increasing recording surfaces in a multi-layer manner along the thickness (depth) direction to enhance a recording capacity to twofold, threefold, . . . has been proposed.

FIG. 5 is a view showing a schematic configuration of a writing once optical head 20 employed in the related single layer recording. In FIG. 5, an optical head 20 comprises a semiconductor laser 21, a collimator lens 22, a deflecting beam splitter 23, a ¼ λ plate 24, condensing lenses 25, 28, a condensing lens actuator 26, a half mirror 27, split detectors 29, 31, and signal amplifiers 35, 32, 33. The optical head 20 coverges an output optical beam of the semiconductor laser 21 to irradiate it onto a surface of an optical disk 30. The optical head 20 outputs the optical beam of constant intensity at the time of reproducing, and outputs the optical beam whose intensity is modulated based on recording data at the time of recording. The optical head 20 is normally placed on a unidimensinal scanning stage and scans the optical beam two-dimensionally over the optical disk 30 which is rotated in the perpendicular direction to the scanning stage.

Meanwhile, in the multi-layer recording system in which the recording surfaces are increased in the thickness direction of the recording medium in a multi-layer manner, since a plurality of focused surfaces are formed along the optical axis direction, difference in a focusing distance in a focal length becomes very wide. Therefore, there is a problem in that the normal focusing format in the single layer according to the related art cannot be applied to the multi-layer recording system.

SUMMARY OF THE INVENTION

In order to eliminate the above-described problem, it is an object of the present invention to provide a three-dimensional optical memory which is able to facilitate focusing in a multi-layer recording.

In order to achieve the above object, according to the first aspect of the present invention, there is provided a three-dimensional optical memory which comprises a recording medium including a plurality of layers in a thickness direction thereof, a plurality of recording surfaces respectively formed on the layers, the recording surfaces each having data recording tracks, and sample servo marks, on which an optical beam is focused, provided respectively on the recording surfaces.

Since the sample servo marks are respectively provided on the recording surfaces of the layers, the recording surfaces can be detected precisely, and therefore, focusing in the multi-layer recording can be made easily.

According to the second aspect of the present invention, it is preferable that the sample servo marks each has at least two mark portions, the at least two mark portions are arranged in a zig-zag manner in the thickness direction of the recording medium while interposing one of the data recording tracks. As a result of this construction, identification of the sample servo marks can be facilitated. For example, when the number of the mark portions is set to two (2) and the optical beam emitted from the optical head is focused onto one of the mark portions, the optical beam is not focused onto the other one of the mark portions. Therefore, reflected beams from two mark portions have different intensities, respectively. The sample servo marks can be identified readily by detecting the reflected beams which have the different intensities, respectively.

According to the third aspect of the present invention, in view of variation of the focus of the optical beam, it is preferable that difference in positions of the at least two mark portions in the thickness direction of the recording medium is set larger than a focus depth (e.g., 2 to 3 μm) of the optical beam which is emitted from an optical head.

According to the fourth aspect of the present invention, the three-dimensional optical memory further comprise a plurality of indication marks which are different from one another depending respectively upon the recording surfaces, at least one of the indication marks being provided close to each of the sample servo marks on the data recording tracks. In accordance with the indication marks, respective recording surfaces can be easily identified. Incidentally, In FIG. 1, a recording surface of a first layer is indicated by "0", a recording surface of a second layer is indicated by "0, 1", and a recording surface of a third layer is indicated by "1, 1".

According to the fifth aspect of the present invention, it is preferable that the indication marks include address codes respectively indicating the recording surfaces thereof.

Furthermore, according to the sixth aspect of the present invention, it is preferable that the sample servo marks and the indication marks are provided in plural numbers at a predetermined interval on the data recording tracks and lines which are perpendicular to the data recording tracks. In this case, the sample servo marks may be employed as samples in the astigmatism method.

DETAILED DESCRIPTION OF THE PREFERRED EMBODIMENT

An embodiment of the present invention will be described with reference to FIGS. 1 to 4.

Figure 2:
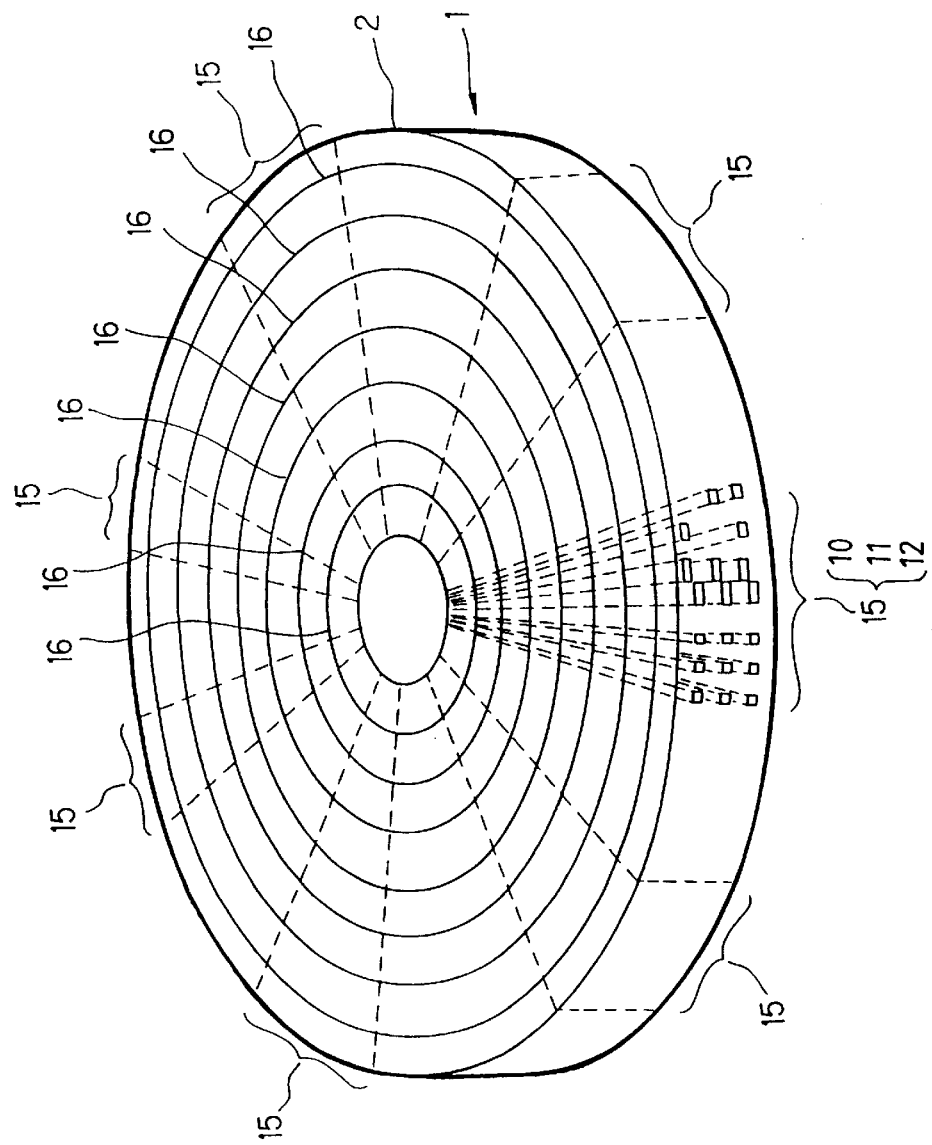
FIG. 2 is a perspective view showing the three-dimensional optical memory in FIG. 1.

In a three-dimensional optical memory 1, an optical disk 2 is employed as a recording medium. Three recording surfaces are arranged in three-dimensional direction (i.e., "thickness direction" or "depth direction") of the optical disk 2. Rotational speed detecting clocks 10, sample servo marks 11 on which an optical beam is focused, address codes 12 employed to respectively indicate the recording surfaces, are recorded on respective recording surfaces. As shown in FIG. 2, data 15, which have the clocks 10, the sample servo marks 11, and the address codes 12, are provided radially from a center portion of the optical disk 2 in the radius direction. A plurality of the data 15 (e.g., about 1000) having the similar configuration are provided at a predetermined interval in the peripheral direction of the optical disk 2. Such data 15 are recorded prior to the factory forwarding.

The sample servo mark 11 includes two mark portions 11a, 11b. The mark portions 11a, 11b of the sample servo marks 11 are arranged in a zig-zag manner to be shifted in the thickness direction of the optical disk 2 such that the data recording track extending in the peripheral direction of the optical disk 2 is put between the mark portions 11a, 11b. The dimensions of the mark portions 11a, 11b in the thickness direction of the optical disk 2 are determined such that a total thickness of the mark portions 11a, 11b is larger than a focus depth of the optical beam from the optical head (e.g., 2 to 3 $\mu$m, see FIG. 4). As a result of the establishment of the total thickness of the mark portions 11a, 11b, since the reflected beams from the mark portions 11a, 11b are different in their intensities even when a focus of the optical beam is varied, the sample servo marks 11 can be surely detected.

Figure 1:
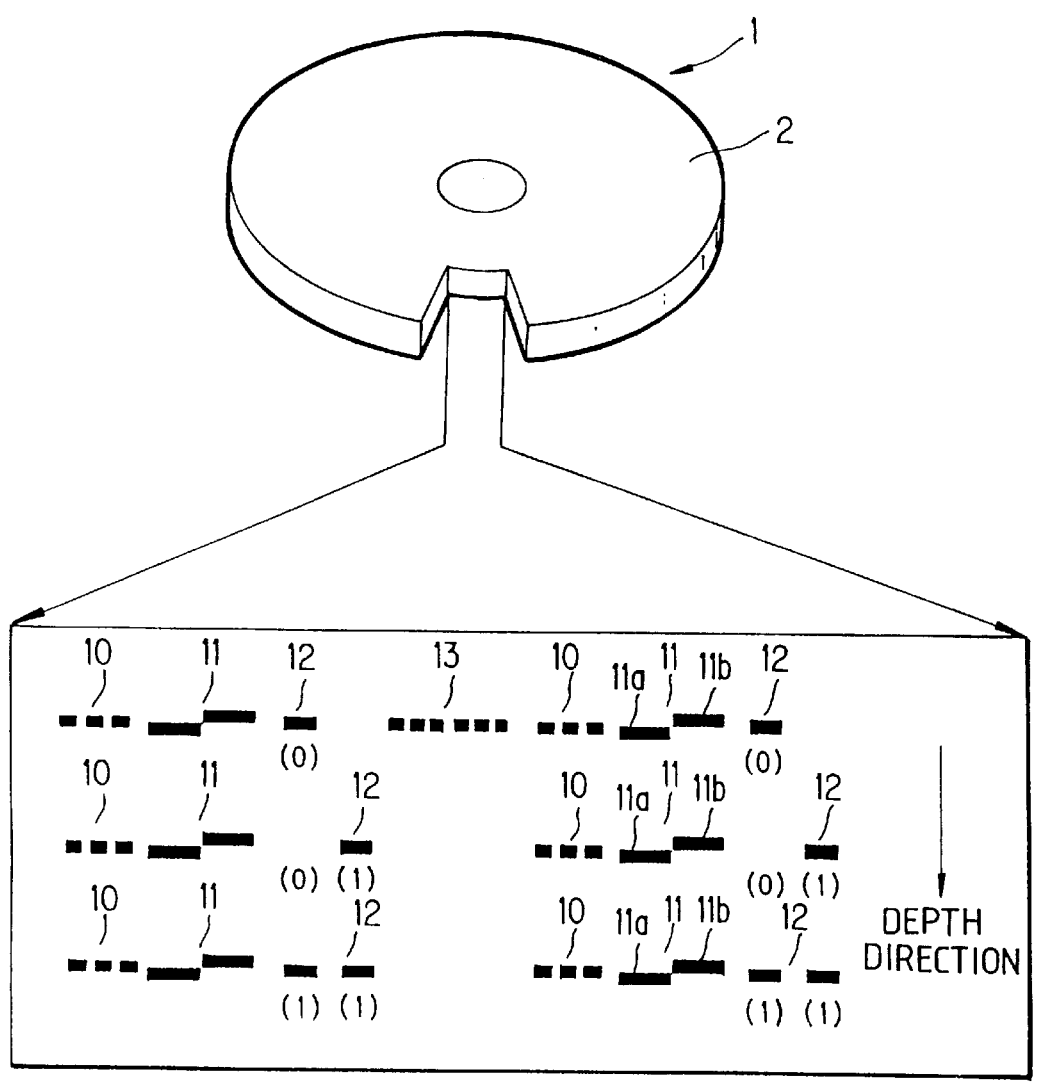
FIG. 1 is a conceptional view showing a three-dimensional optical memory according to an embodiment of the present invention.

The address code 12 indicates the first to third recording surfaces of the optical disk 2, respectively. In FIG. 1, the first layer is indicated by the code "0", the second layer is indicated by the code "0, 1", and the third layer is indicated by the code "1, 1".

Figure 3:
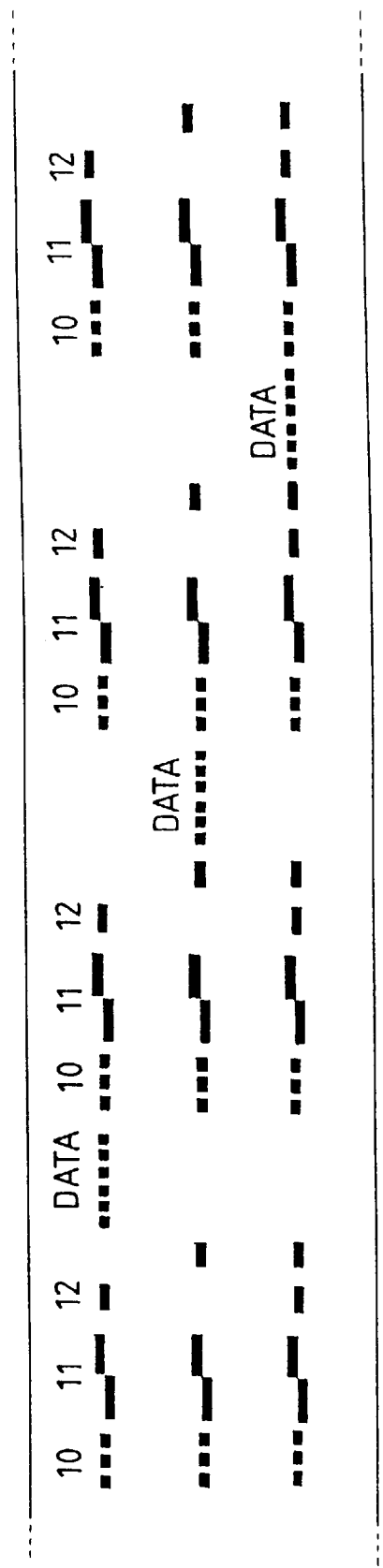
FIG. 3 is a view showing a relationship between a depth of focus of an optical beam from an optical head and a length of a sample servo mark in the depth direction.
Figure 4:
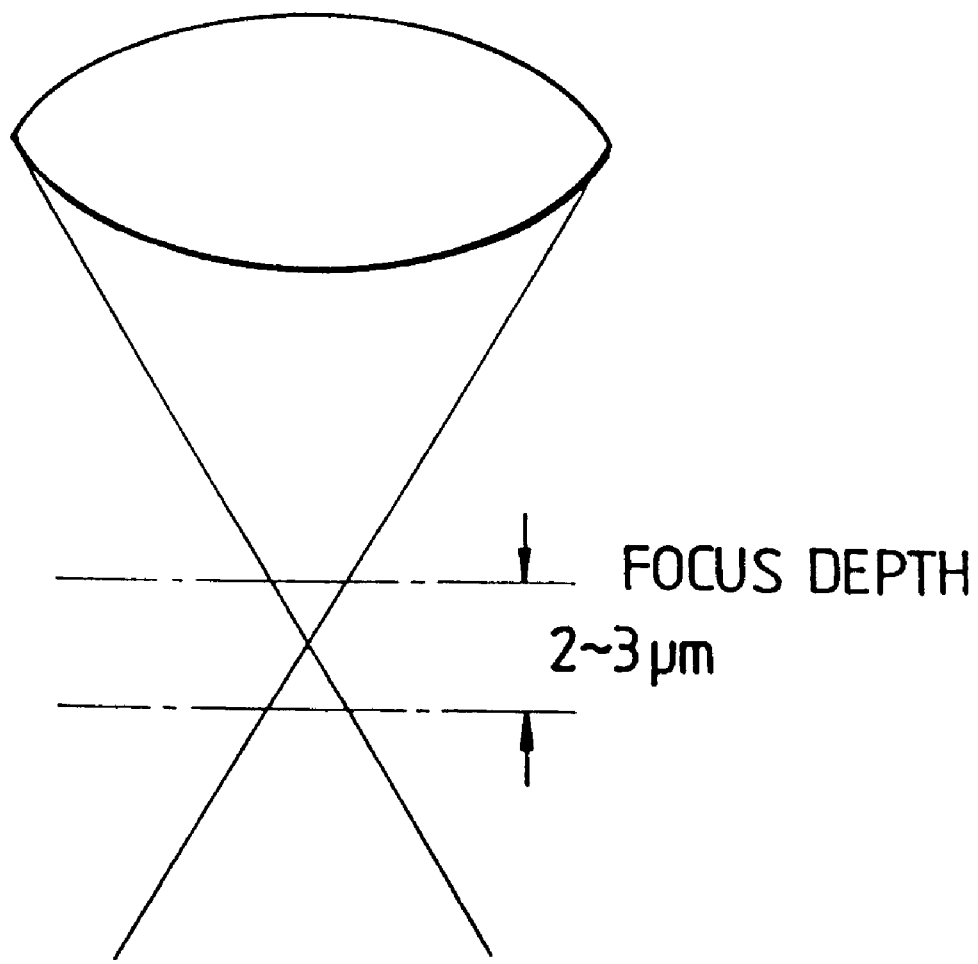
FIG. 4 is a view showing a schematic configuration of the optical head.

Data 13 (see FIG. 1) is recorded between two adjacent data 15. The data 13 is recorded on a track 16 (see FIG. 2), as in the single layer recording system. In this case, the data is recorded only on the recording surface of the first layer in FIG. 1, but actually the data can be recorded on the tracks of the recording surfaces of the first to third layers, as shown in FIG. 3.

Similar to this embodiment, in a case that the optical disk 2 is employed as the recording medium, the sample servo marks 11 and the address codes 12 are provided in plural numbers at a predetermined interval in the radial direction and along the peripheral direction of the optical disk 2. In a case that the optical card or the optical tape is employed as the recording medium, the sample servo marks 11 and the address codes 12 are arranged in plural numbers at a predetermined interval in the width direction and along the traveling direction.

Incidentally, there is no necessity that the sample servo marks 11 and the address codes 12 must be provided successively from a center portion of the optical disk 2 in the radial direction. Since the sample servo marks 11 and the address codes 12 must be located on the track 16, they can be provided intermittently to be positioned at respective tracks 16. This is similar to the optical card and the optical tape.

Figure 5:
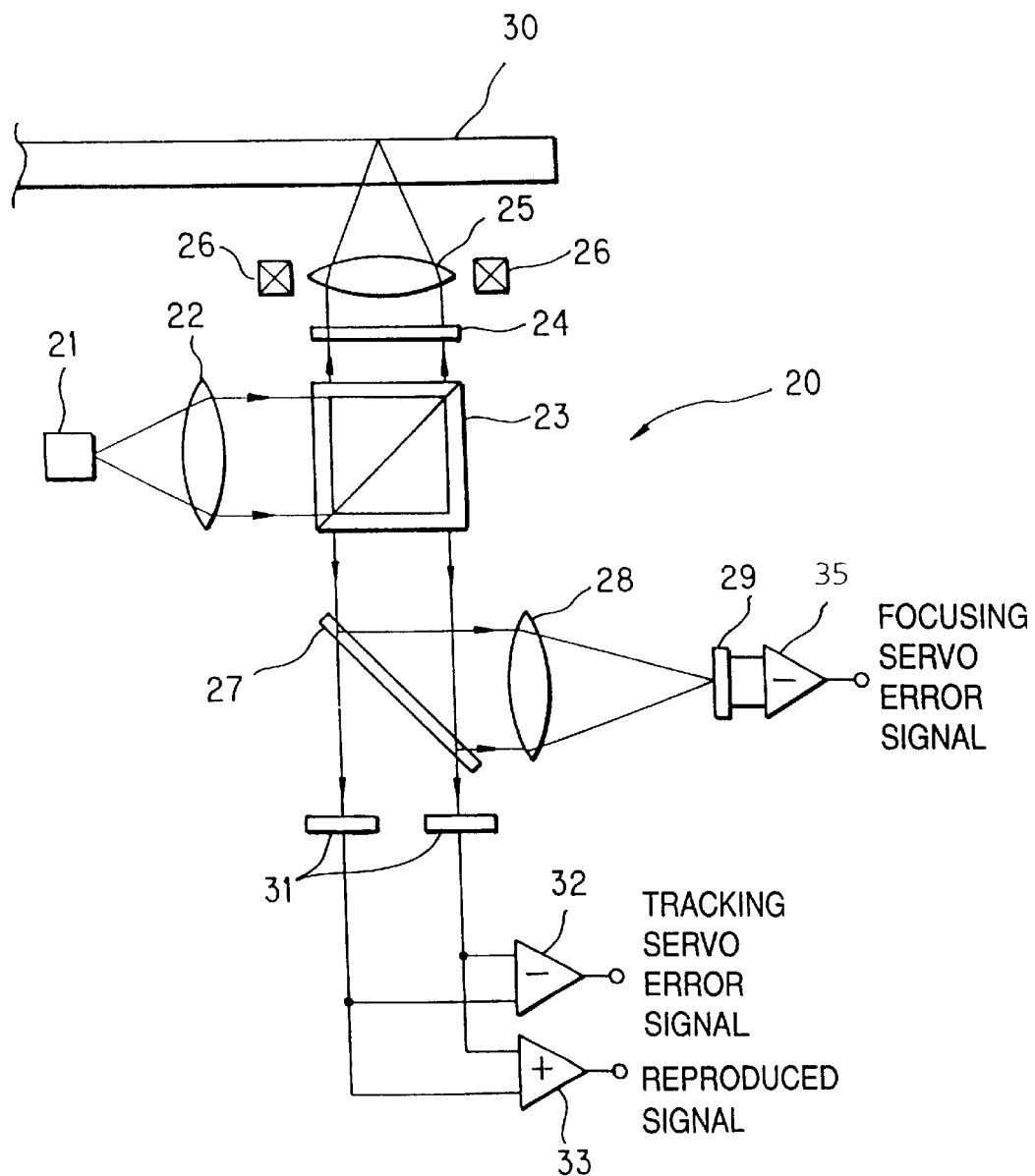
FIG. 5 is a view showing a schematic configuration of an optical head employed in single layer recording system in the related art.

The three-dimensional optical memory 1 according to this embodiment can record/reproduce the data by loading the writing once optical head 20 of FIG. 5 on the three-dimensional scanning stage (not shown). More specifically, respective layers can be identified by detecting the sample servo marks 11 and then respective recording surfaces can be identified by the address codes 12. Accordingly, it is possible to record/reproduce the data onto/from respective layers.

As material of the three-dimensional optical memory 1 according to this embodiment, photopolymer can be employed. In addition, it is more preferable that material having a photo-refractive effect and a photochromic effect, e.g., bismuth silicate ($Bi_{12}SiO_{20}$), lithium niobate ($LiNbO_3$), barium titanate ($BaTiO_3$), etc. should be employed.

In the material utilizing the photo-refractive effect, the data can be recorded according to local change in the refractive index near the condensed spot, and a phase-contrast microscope optical system may be employed as a reproducing optical system.

Further, the sample servo marks 11 may be formed by holographic (analog) exposure.

As described above, in this embodiment, the sample servo marks 11 each of which is constructed by arranging two mark portions 11a, 11b in a zigzag manner along the peripheral direction of the optical disk 2 are recorded on three recording surfaces in the three-dimensional direction (i.e., "thickness direction" or "depth direction") of the optical disk 2 respectively. Therefore, focusing onto respective layers of the recording surfaces can be easily achieved.

Further, difference in positions of two mark portions 11a, 11b in the thickness direction is set larger than the focus depth of the optical beam emitted from the optical head. Therefore, since difference in the intensities of the reflected beams from respective mark portions 11a, 11b appears even when the focus of the optical beam is varied, the sample servo marks 11 can be surely detected.

Moreover, the address codes indicating respective layers of the recording surfaces are recorded substantially close to the sample servo marks 11. Therefore, respective layers of the recording surfaces can be easily discriminated.

In the above embodiment, three layers of the recording surfaces are provided in the optical disk 2, but no limitation is imposed on the number of the recording surfaces. Any number of the recording surfaces may be employed.

Also, each of the sample servo marks 11 is made up of two mark portions 11a, 11b, but there is no limitation on the number of the mark portions. Any number of the mark portions be employed. A shape of the mark portion is not limited to the rectangle, and any shape may be employed.

As described above, according to the present invention, the sample servo marks, each of which is constructed by arranging at least two mark portions in a zig-zag manner along the peripheral direction of the recording medium to be shifted in the thickness direction such that the data recording track extending along the peripheral direction of the recording medium is put between the mark portions, are recorded on respective layers of the recording surfaces along the three-dimensional direction (i.e., "thickness direction" or "depth direction") of the recording medium, respectively. Therefore, there can be provided the three-dimensional optical memory which is able to facilitate the focusing onto respective layers of the recording surfaces.

In addition, a total length value of at least two mark portions in the thickness direction is set larger than the focus depth of the optical beam emitted from the optical head. Therefore, even when the focus of the optical beam is varied, difference in the intensities of the reflected beams from respective mark portions appears and thus the sample servo marks can be surely detected.

Furthermore, the address codes indicating respective layers of the recording surfaces are recorded substantially close the sample servo marks. Therefore, respective layers of the recording surfaces can be easily identified.

What is claimed is:

1. A three-dimensional optical memory, comprising:
a recording medium, including a plurality of layers in a thickness direction thereof;
a plurality of recording surfaces respectively formed on said layers, the recording surfaces each having data recording tracks; and
sample servo marks, onto which an optical beam is focused, provided respectively on said recording surfaces and shifted in the thickness direction of the recording medium such that the data recording tracks for the corresponding layer are placed on one of the recording surfaces between the sample servo marks.

2. A three-dimensional optical memory, comprising:
a recording medium, including a plurality of layers in a thickness direction thereof;
a plurality of recording surfaces respectively formed on said layers, the recording surfaces each having data recording tracks; and
sample servo marks, onto which an optical beam is focused, provided respectively on said recording surfaces,
wherein said sample servo marks each has at least two mark portions, and
wherein the at least two mark portions are arranged in a zig-zag manner in the thickness direction of said recording medium, thereby interposing one of said data recording tracks.

3. The three-dimensional optical memory of claim 2, wherein difference in positions of the at least two mark portions in the thickness direction of the recording medium is set larger than a focus depth of the optical beam which is emitted from an optical head.

4. The three-dimensional optical memory of claim 1, wherein said recording surfaces have a plurality of indication marks which are unique for each recording surface, and at least one of the indication marks is provided in close proximity to each of the sample servo marks on said data recording tracks.

5. The three-dimensional optical memory of claim 2, wherein said recording surfaces have a plurality of indication marks which are unique for each recording surface, and at least one of the indication marks is provided in close proximity to each of the sample servo marks on said data recording tracks.

6. The three-dimensional optical memory of claim 4, wherein the indication marks include address codes respectively indicating the recording surfaces thereof.

7. The three-dimensional optical memory of claim 5, wherein the indication marks include address codes respectively indicating the recording surfaces thereof.

8. The three-dimensional optical memory of claim 4, wherein a plurality of said sample servo marks and said indication marks are provided on said layers at a predetermined interval along said data recording tracks, upon lines which are perpendicular to the data recording tracks.

9. The three-dimensional optical memory of claim 5, wherein a plurality of said sample servo marks and said indication marks are provided on said layers at a predetermined interval along said data recording tracks, upon lines which are perpendicular to the data recording tracks.

10. The three-dimensional optical memory of claim 6, wherein a plurality of said sample servo marks and said indication marks are provided on said layers at a predetermined interval along said data recording tracks, upon lines which are perpendicular to the data recording tracks.

11. The three-dimensional optical memory of claim 7, wherein a plurality of said sample servo marks and said indication marks are provided on said layers at a predetermined interval along said data recording tracks, upon lines which are perpendicular to the data recording tracks.

12. A method of selecting a single layer from a multi-layer recording medium, comprising the steps of:

(a) directing an optical beam onto said multi-layer recording medium having a plurality of recording surfaces therein, wherein servo marks and data recording tracks are placed on a corresponding recording surface;

(b) detecting an intensity difference of said optical beam reflected from the sample servo marks, wherein the sample servo marks are shifted in a thickness direction on said multi-layer recording medium; and (c) focusing said optical beam on a layer between the servo marks, and onto the data recording tracks of one of the plurality of recording surfaces, upon detecting the intensity difference in step (b).

* * * * *